United States Patent [19]

Bernard et al.

[11] Patent Number: 4,715,118
[45] Date of Patent: Dec. 29, 1987

[54] CONNECTING STRIP FOR THE MANUFACTURE OF DIRECT TRANSFER ELECTRIC COMPONENTS AND MANUFACTURING METHOD FOR SUCH COMPONENTS

[75] Inventors: Gilles Bernard, Pourlans; Francois Delalande, Seurre, both of France

[73] Assignee: Compagnie Europeene de Composants Electroniques, Courbevoie, France

[21] Appl. No.: 858,767

[22] Filed: May 2, 1986

[30] Foreign Application Priority Data

May 10, 1985 [FR] France ................. 85 07148

[51] Int. Cl.⁴ .................. H05K 13/02; H01G 1/14
[52] U.S. Cl. .................... 29/856; 361/306; 361/307; 361/308; 29/25.42; 428/572; 428/597
[58] Field of Search .............. 29/25.42, 827, 856; 228/6.2; 361/306, 307, 308; 428/572, 597

[56] References Cited

U.S. PATENT DOCUMENTS

| | | | |
|---|---|---|---|
| 4,158,218 | 6/1979 | McLauriw et al. | 361/308 |
| 4,333,213 | 6/1982 | Meal et al. | 228/6.2 X |
| 4,571,662 | 2/1986 | Conquest et al. | 29/25.42 X |
| 4,578,736 | 3/1986 | Brown | 361/306 |
| 4,617,609 | 10/1986 | Utner et al. | 29/25.42 X |

FOREIGN PATENT DOCUMENTS 130001 1/1985 European Pat. Off. .
162149 11/1985 European Pat. Off. .

Primary Examiner—Howard N. Goldberg
Assistant Examiner—Carl J. Arbes
Attorney, Agent, or Firm—Pollock, VandeSande & Priddy

[57] ABSTRACT

The connecting strip for the manufacture of electric components intended to be used with flow soldering; this connecting strip acts during the entire manufacturing cycle as a support for the base elements of the components and as a joining plane for the molding of the coating resin, the notches punched out in the strip thus limiting the output electrodes of the components as well as the electric connections inside the coating.

10 Claims, 14 Drawing Figures

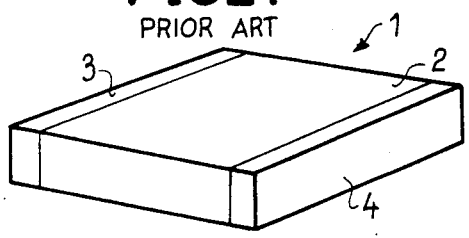
FIG_1 PRIOR ART
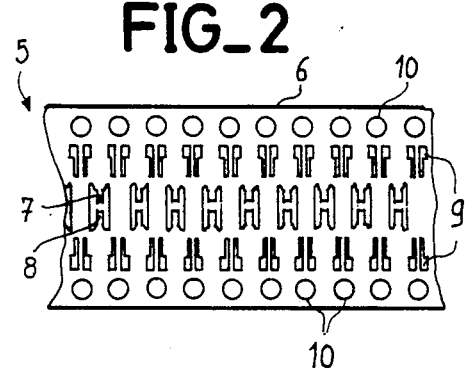
FIG_2
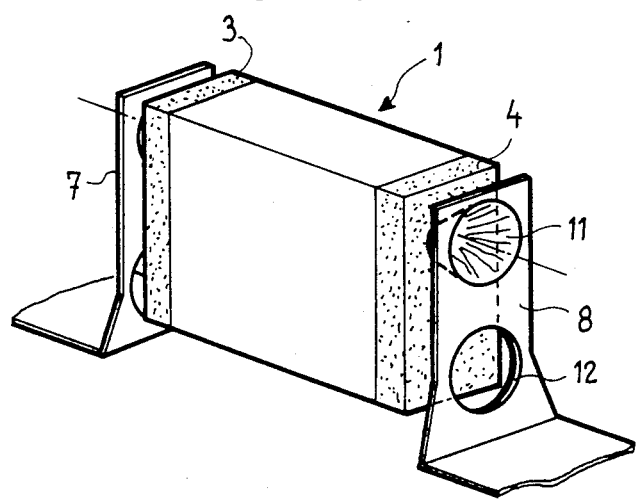
FIG_3
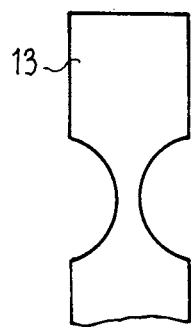
FIG_4
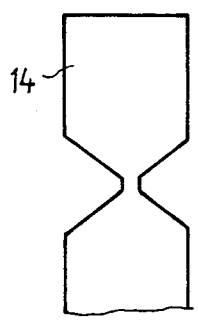
FIG_5
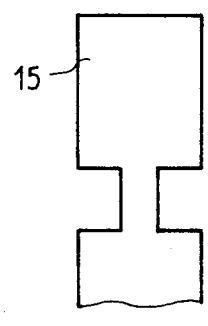
FIG_6

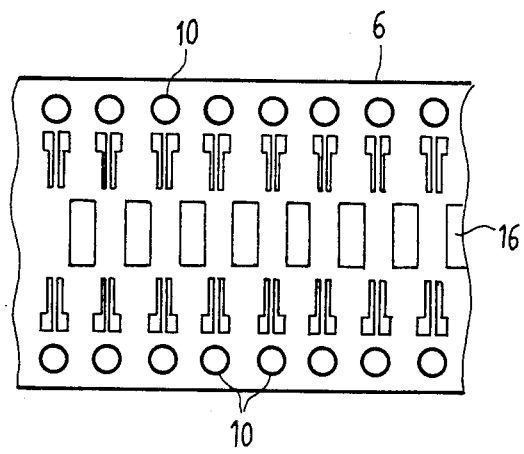
FIG_7
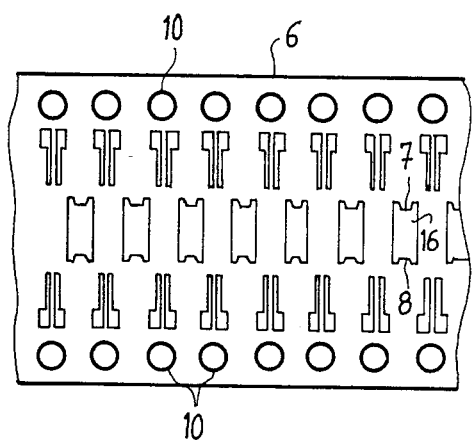
FIG_8
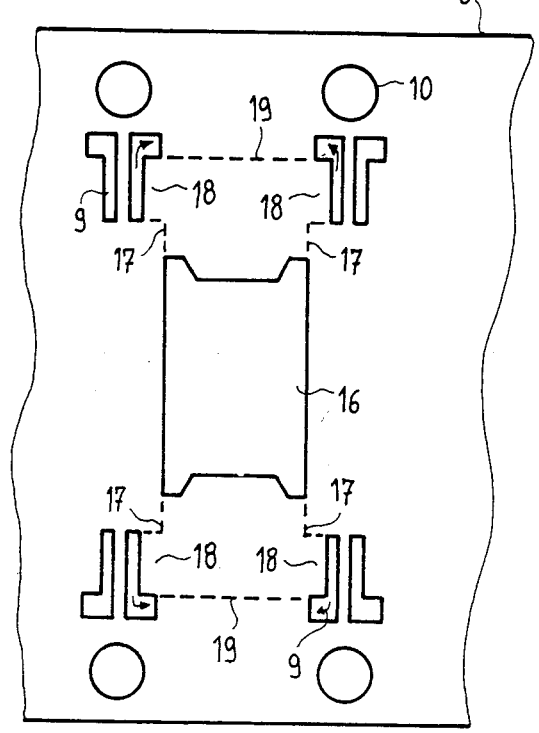
FIG_9

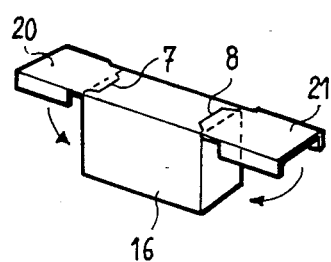
FIG_10
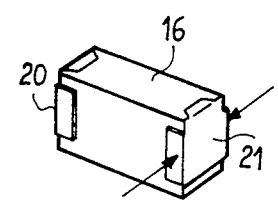
FIG_11
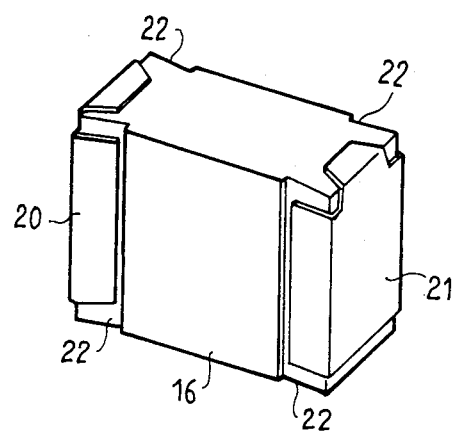
FIG_12

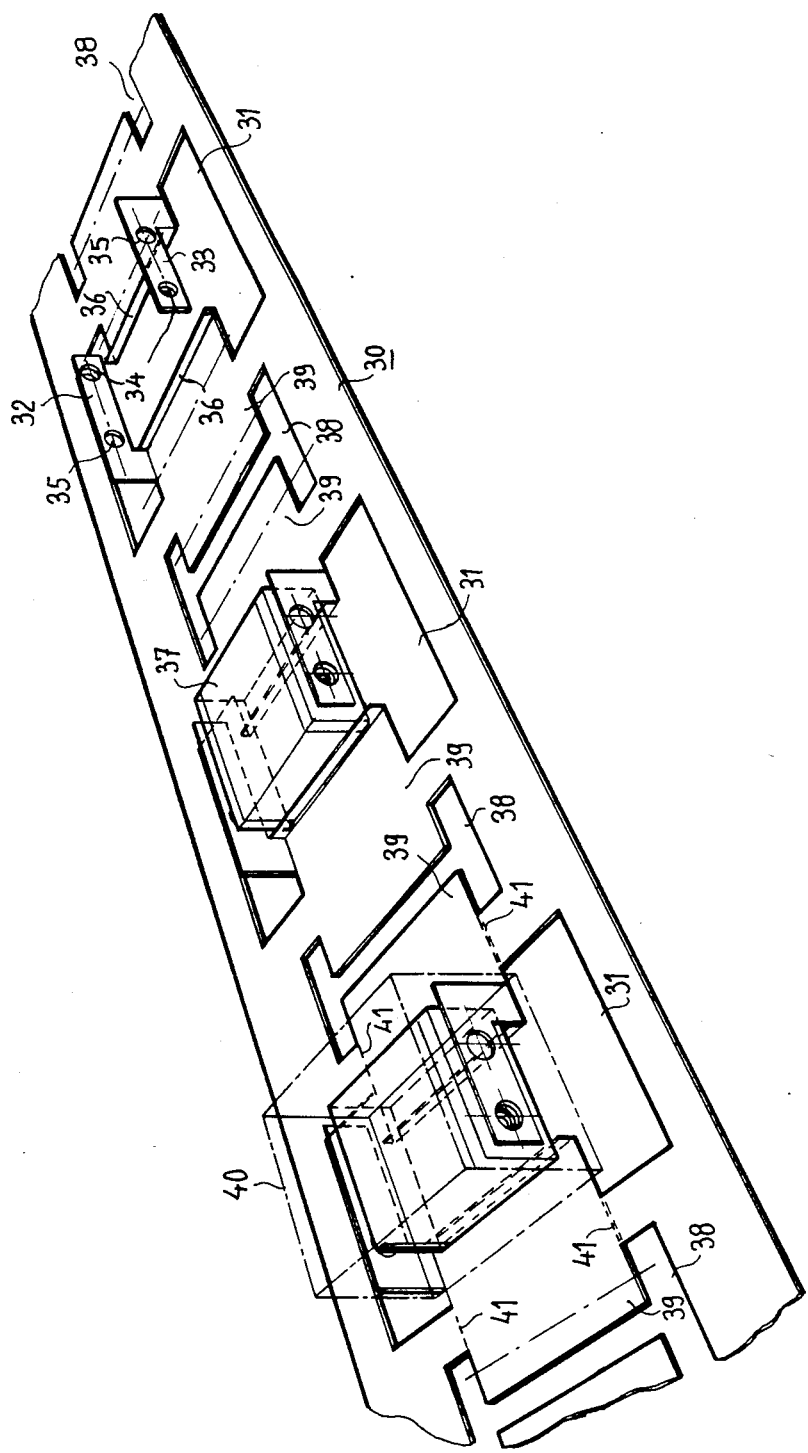
FIG_13

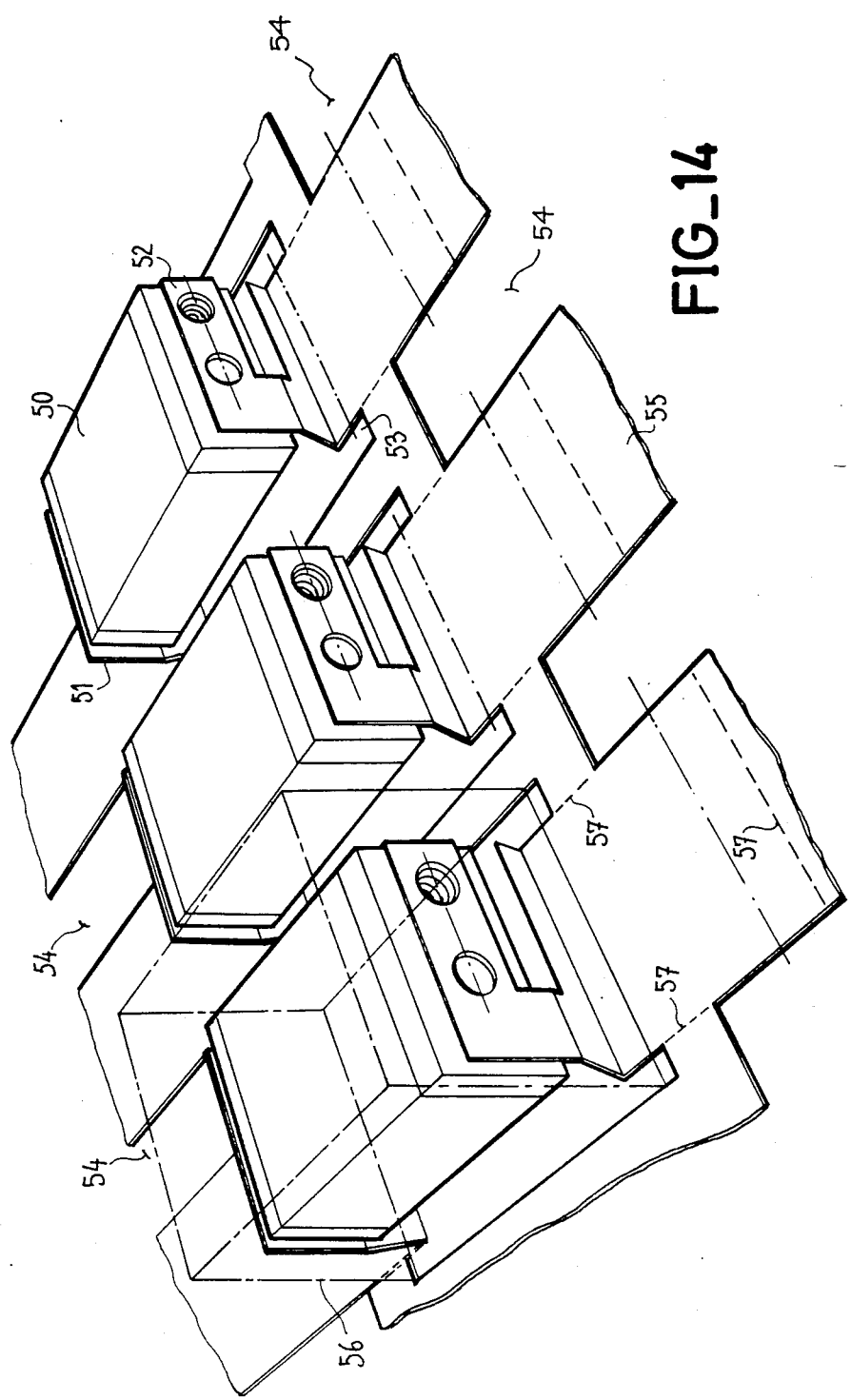

CONNECTING STRIP FOR THE MANUFACTURE OF DIRECT TRANSFER ELECTRIC COMPONENTS AND MANUFACTURING METHOD FOR SUCH COMPONENTS

BACKGROUND OF THE INVENTION

1. Field of the Invention

The present invention concerns a connecting strip for the manufacture of electric components intended to be used for wave or flow soldering.

These electric components are especially represented by parallelepiped shaped capacitors otherwise known as "chips" capacitors. These elements comprise metallized terminals located on two opposite faces of the parallelepiped and which are directly carried over onto the printed circuits by gluing then passing through a soldering flow at about 260° C. for several seconds.

2. Description of the Prior Art

Manufacturing "chips" capacitors from metallized dielectric film raises a certain number of problems. It is known, for example from French patent published under No. 2,011,553, corresponding to U.S. Pat. No. 3,670,378 to produce parallelepiped shaped capacitors of the stacked type from metallized plastic dielectrics. After winding upon a wheel having a large diameter so as to form superposed mother capacitors, then schooping of the lateral faces of the said mother-capacitors, the resulting devices are punched into individual capacitors, perpendicularly to the lateral schoopings. Such capacitors, while having the required form, cannot in practice be used as soldering chips capacitors according to the method mentioned hereinabove. In fact, it has been observed that such capacitors, for example made of metallized polyester, are damaged by mechanical deformations due to the withdrawal of the films utilized, between the two non-schooped faces of the parallelepiped corresponding to the severing face of the mother-capacitor.

French patent application FR 2,555,356 filed on Nov. 18, 1983 describes a novel solution to limit this damage. According to this patent application, the terminals of the capacitor are defined by electric contacts constituted by U-shaped sections comprising constricted zones so as to reduce thermal conduction with respect to contact fingers while ensuring a satisfactory electric conduction. In fact, the use of contact or controller fingers between each lateral schooping of the parallelepiped and the external electric connection of the finished capacitor reduces thermal conduction between the capacitor itself and the external electric connection. In this way, during the flow soldering step, the heat transmission is sufficiently low so as not to provoke any damage or degradation of the capacitor itself.

The method of manufacturing this capacitor causes the intervention of two U-shaped sections having contact fingers that are welded onto the schoopings, the space between the sections being thereafter filled with resin and the resulting structure being punched out to form individual capacitors.

The drawback of this process consists in the utilization of two sections that have to be arranged exactly parallel to each other, upon the positioning of the electric elements with respect to these sections. The coating of these elements is also a rather delicate operation to perform.

In order to overcome these drawbacks, the invention proposes a connecting strip acting throughout the whole manufacturing cycle: firstly, as a support for the elements which are soldered onto tags integral with the strip. The strip thereafter acts as a joining plane for the molding of the coating resin. A punching out of the strip thereafter allows the electric connections of the component to be obtained. The tightness achieved by the strip during molding prevents any risk of the definitive connections or terminals of the capacitor getting dirty. Due to its general conception, this strip allows simple and accurate positioning and reliable contacting time and consequently greater reliability and improved quality for welding the components onto the tags.

SUMMARY OF THE INVENTION

The object of the present invention is thus a connecting strip for the manufacture of at least one direct transfer electric component obtained from a metal foil or sheet, the component comprised of an active or passive element having two electric terminations and coated by a protective coating. The component comprises two electric connections, each of the connections comprising a part situated at the surface of the coating in order to form one of the electrodes of the component and a part ensuring the electric connection with the corresponding termination. The component is characterized in that notches are stamped out from the said metal foil in order to produce electrical connections, comprising:
  at least two attachment tags intended to be folded over onto the electric terminations in order to maintain in position the said element and ensure the electrical connections;
  the electrodes of the component after final punching and folding.

The attachment tags can be cut out in the form of an H.

In order to ensure efficient thermal protection of the element, it is preferable that at least one of the attachment tags present a boss, the head of which ensures the connection with the corresponding electric termination.

In order not to damage the active or passive element during flow soldering of the resulting component, it is advantageous to produce a thermal resistance between the electric terminations of the element and the electrodes of the component. This will be obtained by reducing the section of at least one of the attachment tags.

In order to facilitate automatic operation of the method, the connecting strip will be provided with means allowing it to be driven. These means can be holes perforated on the lateral edges of the strip and intended to receive the cogs of a driving device. A further object of the invention is a method of manufacturing such an electric component by means of the connecting strip defined hereinabove. This method comprises at least the following steps:
  (a) stacking the attachment tags in such a way as to receive the said element;
  (b) placing the elements in position, the attachment tags retaining the elements while ensuring the electric contact with the corresponding terminations;
  (c) soldering the terminations to their attachment tags;
  (d) coating the elements, the connecting strip acting as a joining plane for the molding;
  (e) punching out the connecting strip in order to delimit each electric component and the parts intended to form its electrodes;

(f) stacking and crimping on the component the parts delimited during the preceding step.

The parts of the electrodes thus constituted advantageously form crimping clips on the coating mass.

BRIEF DESCRIPTION OF THE DRAWINGS

The invention will become more clearly apparent and other advantages will appear from the following description given with reference to the appended drawings in which:

FIG. 1 represents a stacked capacitor element;

FIG. 2 is a view from above of a connecting strip according to the invention;

FIG. 3 is a detailed view representing the mounting of the capacitor element between the attachment tags;

FIGS. 4, 5 and 6 represent different possible sections for the attachment tags;

FIGS. 7 and 8 are, respectively, views from above and below of the connecting strip after coating of the elements;

FIG. 9 is also a view from below but on a larger scale of the connecting strip;

FIGS. 10 and 11 describe folding and crimping operations of the electrodes;

FIG. 12 is a view of the electric component obtained at the end of the method;

FIGS. 13 and 14 are alternative embodiments of the connecting strips according to the invention.

DESCRIPTION OF THE PREFERRED EMBODIMENT

In the following portion of the description, the manufacture of chips capacitors for flow soldering will be described as well as other passive or active elements.

FIG. 1 represents an electronic element intended to be conditioned in the form of a direct transfer element. Element 1 is, for example, a capacitor obtained by a stacking 2 of metallized foils or sheets. In a conventional manner, the electric terminations 3 and 4 of element 1 are constituted by schooping of two opposed faces of the parallelepiped constituting the element.

FIG. 2 is a view from above of a connecting strip 5 allowing the conditioning of element 1. Strip 5 is made of a resilient metallic foil 6 made of low thermal conductively (steel, bronze, etc.). The foil must be formed of a metal that can be soldered on the schoopings 3 and 4. These terminations are generally made of aluminum utilized either alone or in successive layers of aluminum and a tin-lead alloy. The choice of a metal to constitute the foil will be selected accordingly. Several types of notches are then cut into this foil. Firstly, along the longitudinal axis of the foil, H-shaped notches have been cut out in order to dispose of metallic tongues 7 and 8 that will act as attachment tags. It is thus preferable that the punching out be performed so that the attaching of the tags to the remainder of the foil is obtained along widening surfaces, such as represented in FIG. 2. This will render folding more simple and confer an improved resilience on the attachment tags so as to secure the element 1. Other notches have been punched out, thereby determining the electrodes of the future components. FIG. 2 represents the L-shaped notches under the reference numeral 9.

To each H-shaped notch correspond four L-shaped notches that surround it. Each lateral edge of the foil is perforated with holes 10 to cooperate with a device for driving the foil during automated manufacture.

Tongues 7 and 8 are folded upright in order to form attachment tags. A capacitor will be disposed between these attachment tags being in contact with the schoopings. FIG. 3 is a detailed view representing said arrangement. As shown in this figure, element 1 is placed upright but it could be placed flat. It is secured in position by tags 7 and 8. It is advantageous to proceed to certain modifications of the attachment tags for the following reasons. In order to ensure correct maintenance of the element 1 and to facilitate its soldering, tags 7 and 8 will be provided with bosses 11, the heads of which ensure electric contact and mechanical cooperation with the element 1. In order to allow element 1 to retain its properties, said element should be able to withstand without any damage the thermal stresses of flat transfer. Reducing the section of the attachment tags allows the creation of a thermal resistance between the terminations of element 1 and its electrodes. Therefore, in the case of a capacitor element it will be possible to avoid exceding a 0.2% variation of the capacity after flow soldering of the component (about 265° C. for 10 seconds). The constriction of the section is performed on a short length in order not to excessively increase the series resistance of the connection and, consequently, the losses of the capacitor. The constriction of the section can be obtained by perforating holes 12 in the attachment tags. Other forms may be envisaged, such as shown by the attachment tags 13 of FIG. 4, 14 of FIG. 5 and 15 of FIG. 6.

The permanent connection of the tags upon the element can be obtained through soldering.

Once the soldering has been performed, the coating of the elements is carried out. The connecting strip will advantageously act as a joining plane for the molding. The coating of the elements can be obtained according to various known techniques. It is possible, for example, to proceed with a molding by liquid injection of a self-extinguishable resin, molding by powder transfer, by casting, etc. A certain type of resin known under the reference 0451 Bakelite can be utilized since it has the advantage of ensuring good thermal protection of the component during flow soldering. As other ingredients, it is possible to cite Methyltetrahydrophthatilic (MTHPA) and the Benzyldimethylamine (BDMA) accelerator. The resin can also be: non loaded with low thermal conductibility, loaded (hollow glass balls, micropowder, etc., . . . ) or cellular in the form of foam.

FIGS. 7 and 8 are, respectively, views from above and from below of the connecting strip after coating of the elements. These figures have the advantage of showing the bulk of the coated element 16 with respect to the remainder of the foil 6. Due to this FIG. 8, it will be noted how the tags 7 and 8 issue from the coating.

The coated elements, presented on a continuous or discontinuous strip, are ready to undergo the last steps of the manufacturing method: punching out and folding over of the electrodes.

Firstly, clips are produced that will act to secure in position the electrodes upon their future sites. In order to do this, a punching out is performed along the dotted lines referenced 17 on FIG. 9 and the parts 18 are drawn back at a right angle as indicated by the arrows. It will be observed that it is possible initially to foresee the notches 17. Thereafter, punching out of each individual capacitor is performed. This punching out can be performed along the dotted lines 19 as indicated in FIG. 9.

FIG. 10 represents the component obtained after severing from the foil 6. The form of the electrodes 20 and 21 is follows the notches 9, 17 and 19. The electrodes 20 and 21 are thus folded over at a right angle in the direction indicated by the arrows. They are thereafter crimped upon the coating of the component as shown by the arrows on FIG. 11 for electrode 21.

It is possible to foresee, during molding, recesses in the resin for receiving the crimped parts in order to optimize the mechanical behavior of the connections. FIG. 12 represents the component obtained upon completion of the operation. It is possible to see recesses 22 provided for the crimping.

The marking of the components can be performed in a conventional manner or by laser recording. The component can be conditioned in bulk or on the strip.

Other forms of notches can, of course, be envisaged. The passive or active elements can be disposed flatly or laterally. The attachment tags can be disposed parallely to the electrodes or at 90° with respect to said electrodes. It is also possible to provide foldings in such a way as to place the element in position with increased stability prior to soldering.

FIG. 13 represents another possible configuration for the connecting strip. In order to facilitate understanding, several steps of the method have been represented on the same figure. The foil 30 includes attachment tags 32 and 33 bent upwardly from notches 31. As previously described, these attachment tags can include bosses 34 and holes 35. It will also be noted that two other folds 36 are used for positioning element 37.

Foil 30 also presents second notches 38 alternating with the first notches. The parts 39 located between the first and the second notches will form components after a further punching out of the foil and after folding over of the electrodes. Broken line 40 represents the coating limits. After a punching out along the broken line 41, the electrodes of the component are delimited.

FIG. 14 represents yet a further configuration for which the electrodes of the component are folded over in planes parallel to the attachment tags. Element 50 is maintained in position by attachment tags 51 and 52 obtained after punching out notches 53. These notches 53 are surrounded by other notches 54 punched out in the connecting strip 55 that has not been represented over its entire length. As previously described, the dotted line 56 represents the coating limits. The broken lines 57 represent the notches that will thereafter be punched out.

As explained hereinabove, this process and method apply in particular to the manufacture of chips capacitors for flow soldering. The capacitor elements being disposed in a strip or connecting grid at a regular step, the following functions can be ensured:
- transport of the elements for reliable and sure industrial manufacture;
- sealing for the molding (epoxy, powder or liquid);
- external connections and connection with the capacitor element;
- protection of the electrodes against any risk of being dirtied during molding;
- ease of measurement for manufacturing checks and controls;
- ease of conditioning;
- thermal protection with respect to the mechanical and electrical connection.

We claim:

1. A connecting strip useful in completion of manufacture of at least one direct transfer electric component presented as a solid body with a pair of body electrodes, said component, when completed having two electric terminations and a protective coating, each of said terminations including an electrical connection to one of the body electrodes, said strip comprising a metal foil with notches stamped out to provide:
   at least two attachment tag means to be folded over near the terminations to maintain said solid body in position relative to said strip to ensure an electrical connection between each said body electrode and one of said attachment tag means, at least one of said attachment tag means including a boss with head means to support said body and provide an electrical connection to an adjacent body electrode, and
   at least two strip electrode means to provide, after punching and folding, two exterior contacts to form said terminations, each of said terminations comprising a strip electrode means in contact with an attachment tag means which in turn is in contact with said body electrode.

2. A connecting strip as recited in claim 1, wherein at least one of said attachment tag means has a length which presents at least two different cross section areas.

3. A connecting strip as recited in claim 1, wherein at least one of said attachment tag means has at least one section of reduced cross section area.

4. A connecting strip as recited in claim 3, wherein said reduced cross section area is located at a hole perforated in said strip.

5. A connecting strip as recited in claim 1, wherein said attachment tag means comprise a portion of said strip formed from an H shaped notch.

6. A connecting strip as recited in claim 5, wherein said H shaped notch is located with a longer dimension extending transversely of said strip.

7. A connecting strip as recited in claim 5, wherein said strip electrode means comprise a portion of said strip having a form of four L shaped notches located adjacent to and surrounding said H shaped notch.

8. A connecting strip as recited in claim 1, wherein said strip further includes driving means for transmitting a driving force to said strip.

9. A connecting strip as recited in claim 8, wherein said driving means comprise a series of holes perforated along at least one edge of said strip.

10. A method of manufacturing an electric component from an intermediate form in which said electric component is presented as a solid body with a pair of body electrodes, said component, when completed having two electric terminations and a protective coating, each of said terminations including an electrical connection to one of the body electrodes, said method comprising the steps of:
   (a) providing a strip comprising a metal foil with notches stamped out to provide at least two attachment tags to be folded over near the terminations to maintain said solid body in position relative to said strip to ensure an electrical connection between each said body electrode and one of said attachment tag means, and at least two strip electrodes to provide, after punching and folding, two exterior contacts to form said terminations, each of said terminations comprising a strip electrode in contact with an attachment tag which in turn is in contact with said body electrode,
   (b) folding said attachment tags so as to receive said solid body, (c) placing said solid body in position so that said attachment tags support said body while in electric contact with said body electrodes,
(d) soldering said body electrodes to the attachment tags,
(e) coating said body electrode with said strip acting as a support for the coating step,
(f) punching the strip to delimit each electric component and the strip electrodes, and
(g) folding and crimping the strip electrodes.

* * * * *